United States Patent [19]

Williamson

[11] 4,430,913

[45] Feb. 14, 1984

[54] CUT-OFF AND FACE MACHINE

[75] Inventor: Calvin C. Williamson, Napa, Calif.

[73] Assignee: Kaiser Steel Corporation, Oakland, Calif.

[21] Appl. No.: 360,905

[22] Filed: Mar. 23, 1982

[51] Int. Cl.$^3$ .............................................. B23B 3/04
[52] U.S. Cl. ......................................... 82/70.2; 82/59
[58] Field of Search ...................... 82/46, 47, 59, 70.2, 82/4 C, 60, 2.5; 409/180, 185; 144/205

[56] References Cited

U.S. PATENT DOCUMENTS

| | | | |
|---|---|---|---|
| 2,537,916 | 1/1951 | Rosenboom | 144/205 |
| 3,168,002 | 2/1965 | Walling | 409/180 |
| 3,724,303 | 4/1973 | Rinaldo | 82/59 |
| 3,732,758 | 5/1973 | Rinaldo | 82/4 C |
| 3,848,489 | 11/1974 | Santana | 82/70.2 |
| 3,916,519 | 11/1975 | Gilmore | 82/70.2 |
| 4,219,370 | 8/1980 | Hoaglin et al. | 148/9.6 |

Primary Examiner—W. D. Bray
Attorney, Agent, or Firm—James E. Toomey; James A. LaBarre

[57] ABSTRACT

A pipe facing machine performs cutting, bevelling and deburring operations on an end of a pipe that is stationarily held in the same position during all three operations. A tool head that rotates about the pipe carries knives for performing the various operations. Initially, two diametrically opposed cutting knives are advanced in a radially inward direction to engage the pipe while the tool head is rotating to cut it at a predetermined location. Thereafter, as the cutting knives are being withdrawn, a bevelling knife and a deburring knife are advanced radially inward to a point where the bevelling knife provides a desired bevel on the cut edge of the pipe. During the radially inward motion of the deburring knife, it is maintained at an axially displaced position where it does not engage the pipe. Once it is located radially within the interior of the pipe, it is axially moved to a position where it is in alignment with the cut, bevelled edge of the pipe, and it is then withdrawn in a radially outward direction simultaneously with the bevelling knife, to remove the burr provided on the interior edge of the pipe by the bevelling knife.

19 Claims, 19 Drawing Figures

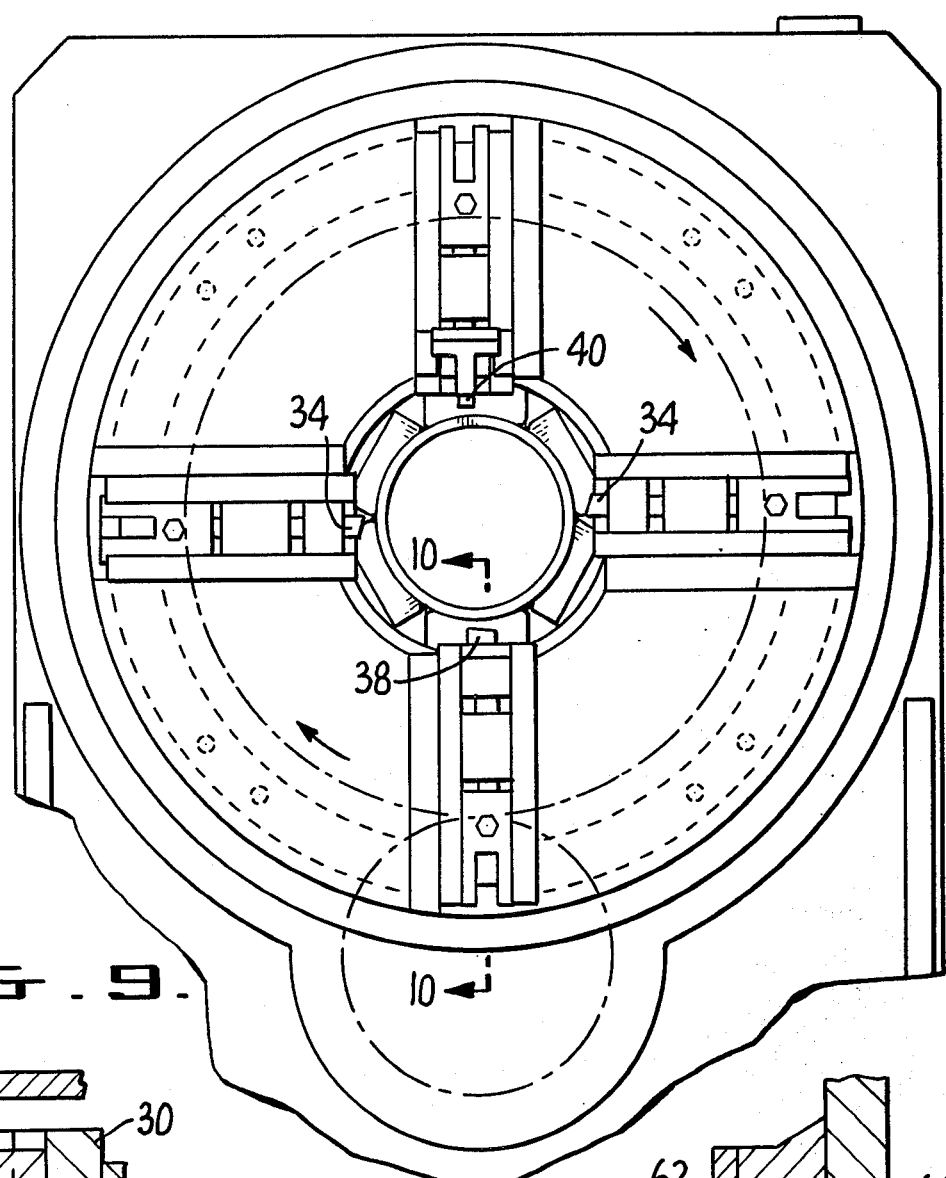
FIG. 9.
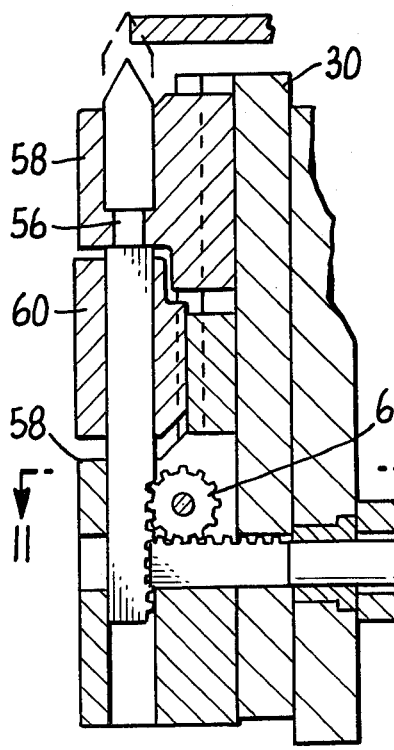
FIG. 10.
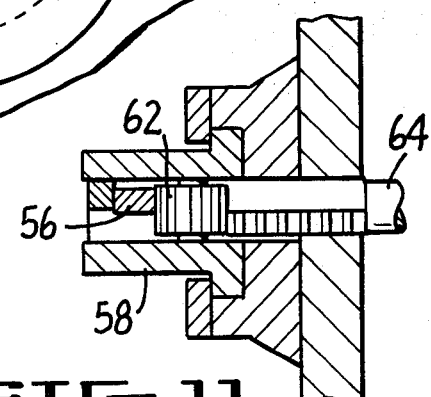
FIG. 11.
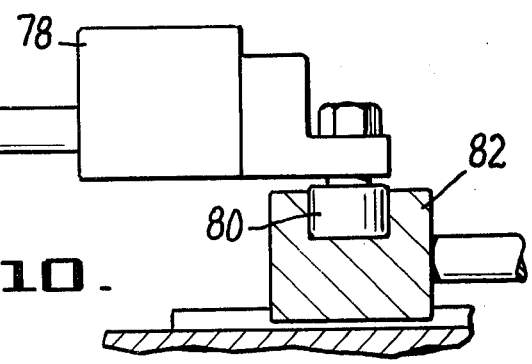

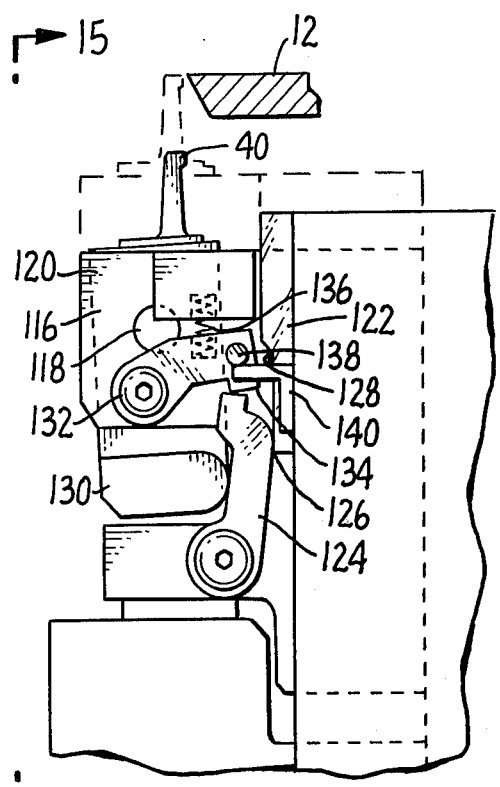
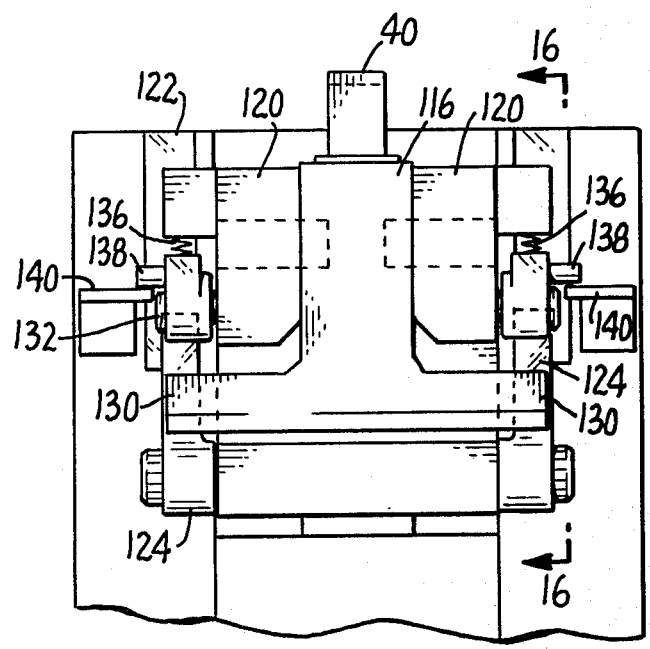
FIG.14.
FIG.15.
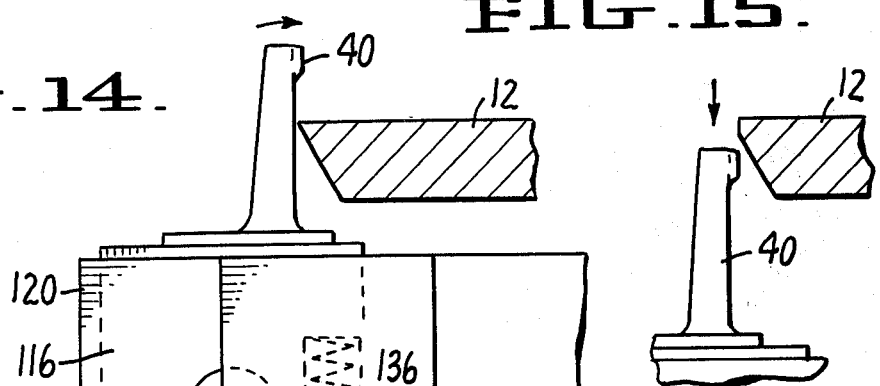
FIG.17
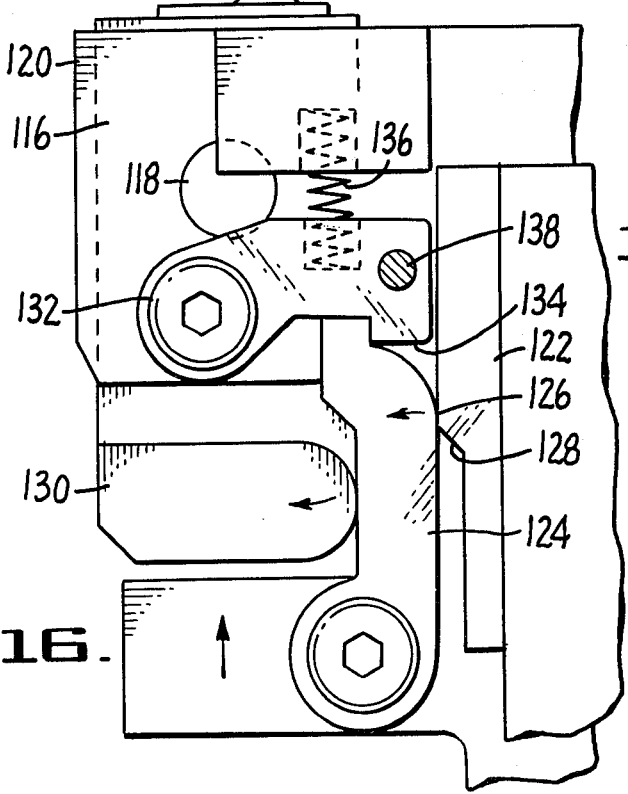
FIG.16.

CUT-OFF AND FACE MACHINE

BACKGROUND OF THE INVENTION

The present invention relates to an apparatus for facing the ends of tubular articles such as steel pipes, and more particularly to an apparatus for performing each of the operations of cutting, bevelling and deburring the end of a pipe at a single location.

The cutting and trimming of steel pipe typically involves the operations of first cutting a segment off the end of the pipe to bring the pipe to a specified length. The cut is generally made in a direction perpendicular to the axis of the pipe so that the cut edge of the pipe is relatively square. Thereafter, a bevel is provided in the cut edge of the pipe, for example to provide a design that more readily facilitates welding of pipes to one another in an end-to-end relationship. The bevelling operation can result in a burr being produced on the interior edge of the pipe wall, which must be removed so that two pipes can be readily joined. The deburring operation typically involves placing a deburring knife within the interior of the pipe and moving it in a radially outward direction to trim the cut edge of the pipe from the inside out.

In the past, these operations have typically been performed by cutting tools that are mounted in stationary positions, and the cutting operations are performed by rotating the pipe about its longitudinal axis while advancing the cutting tools into engagement therewith. A major disadvantage associated with this type of operation results from the fact that pipes of substantial length, for example in the range of 16-60 feet, are rarely perfectly linear. Thus, if the pipe is rotated so that the end being trimmed rotates about a stationary axis, the remote end of the pipe can travel in a relatively wide circular path. This type of motion can result in the remote end of the pipe being banged against support structure, thereby leading to wear of the support structure and possible damage to the pipe. In addition, the centrifugal forces generated by the rotation of the remote end and the banging of the pipe set up vibrations at the end of the pipe that is being trimmed, which can lead to premature wear and even breakage of the cutting tools.

Accordingly, it is a general object of the present invention to provide a novel pipe facing apparatus in which the pipe is held in a stationary position during the facing operations so that nonlinearity of the pipe will not have any effect upon rotary motion required for the various facing operations.

It is another object of the present invention to provide a novel pipe facing apparatus of this type that is capable of carrying out each of the operations of cutting, bevelling and deburring at a single location, to thereby decrease the number of separate processing steps that a pipe is required to undergo during a facing operation.

It is a further object of the present invention to provide a novel pipe facing apparatus that advances one or more rotating cutting tools in a radial direction into engagement with a pipe to cut the same, and then simultaneously advances a bevelling tool and a deburring tool in a radial direction as the cutting tool is being withdrawn, to bevel the pipe end during radially inward advancement of the tools and deburr the pipe end during subsequent radial outward withdrawal.

The manner in which the present invention achieves these objects, as well as their attendant advantages, can be best appreciated by reference to the following detailed description of the preferred embodiment of the invention illustrated in the accompanying drawings.

BRIEF DESCRIPTION OF THE DRAWINGS

FIG. 9 is an end view of the pipe cutting and trimming apparatus from the end at which the cutting and trimming operations take place, taken along the section line 9—9 of FIG. 4;

FIG. 10 is a sectional side view taken along the section line 10—10 of FIG. 9, illustrating the cutting tool advancing mechanism;

FIG. 11 is a sectional top view taken along the section line 11—11 of FIG. 10, illustrating the rack and pinion arrangement for the advancing mechanism;

FIG. 14 is a detailed side view of the deburring knife support and control mechanism during radially inward advancement;

FIG. 15 is an end view of the deburring knife support and control mechanism;

FIG. 16 is a more detailed side view, taken along the line 16—16 of FIG. 15; illustrating the deburring knife in the cutting position; and FIG. 17 is a detailed side view of the deburring knife, similar to a portion of FIG. 16, illustrating the radially outward stroke of the knife.

DETAILED DESCRIPTION

The following discussion of the preferred embodiment of the present invention is described with reference to its use in a steel pipe processing mill, to facilitate an understanding of the invention and its operation. Typically, pipes that are cut and trimmed with the apparatus of the present invention in a pipe processing mill can range from 16 to 60 feet in length and have a diameter from 4 to 16 inches. It will be appreciated by those of ordinary skill in the art, however, that the applicability of the invention is not so limited, and that other appropriate uses for the invention will become apparent with an understanding of the functions that it is capable of performing.

Figure 1:
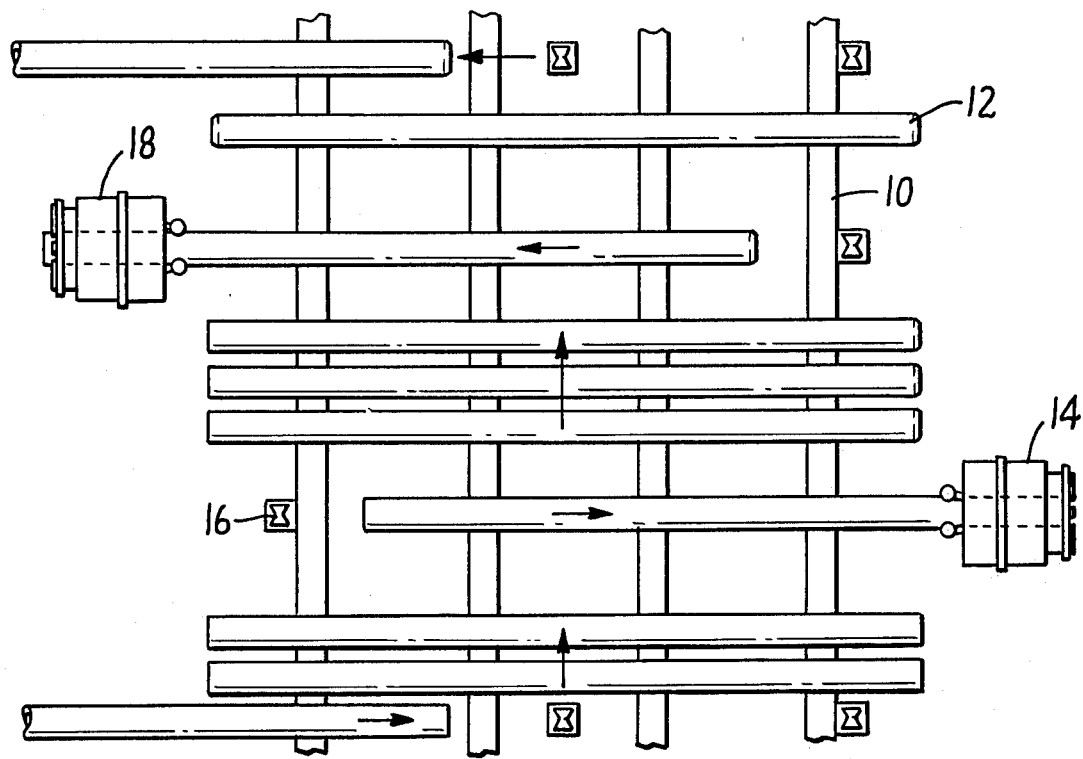
FIG. 1 is a plan view of a portion of a pipe processing mill in which each end of a pipe undergoes a facing operation in an apparatus constructed in accordance with the present invention.

Referring to FIG. 1, the end facing station of a pipe mill includes a conveyor table 10 for moving pipes 12 in a generally transverse direction through the station, i.e. from bottom to top as viewed in FIG. 1. At a first point in the path of travel through the station, the transverse movement of a pipe is interrupted, and it is advanced in a longitudinal direction, i.e. from left to right as viewed in FIG. 1, to bring one end into operative relationship with a first end facing machine 14. The longitudinal movement of the pipes can be carried out by means of rollers 16, for example, disposed at the location of the end facing machine 14 so as to selectively engage and disengage pipes as they traverse across the processing station.

One end of the pipe is appropriately cut and trimmed in the first facing machine 14, is returned to the conveyor table 10 by means of the rollers 16 and is moved to a second location where it is longitudinally advanced in the other direction, i.e. from right to left as viewed in FIG. 1, to bring the other end of the pipe into operative relationship with a second end facing machine 18. At the second end facing machine, the other end of the pipe is appropriately cut and trimmed, and the pipe is then returned to the conveyor table 10. Thereafter, it is moved to a location where the pipe is removed from the conveyor table and advanced to another station for further processing or storage.

Figure 2:
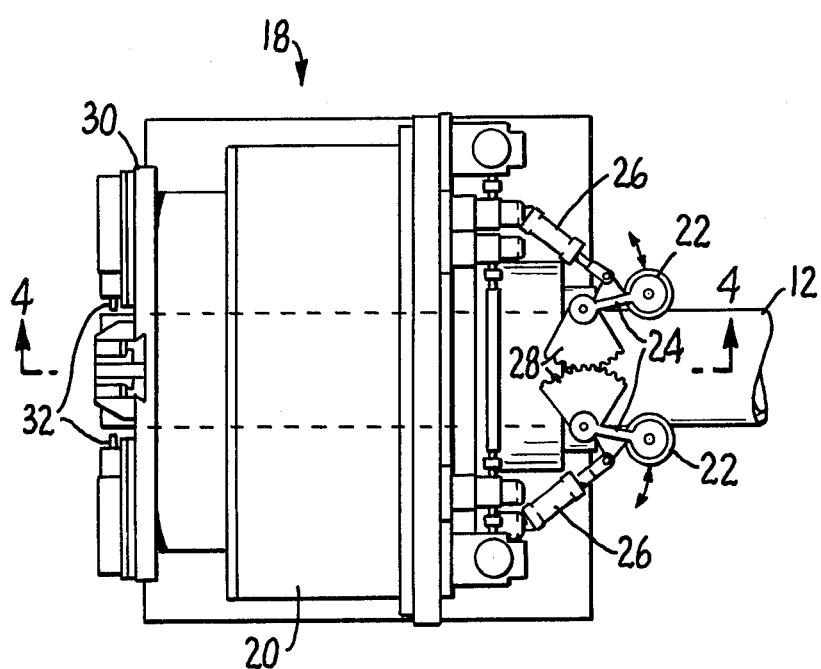
FIG. 2 is a top view of the pipe cutting and trimming apparatus.
Figure 4:
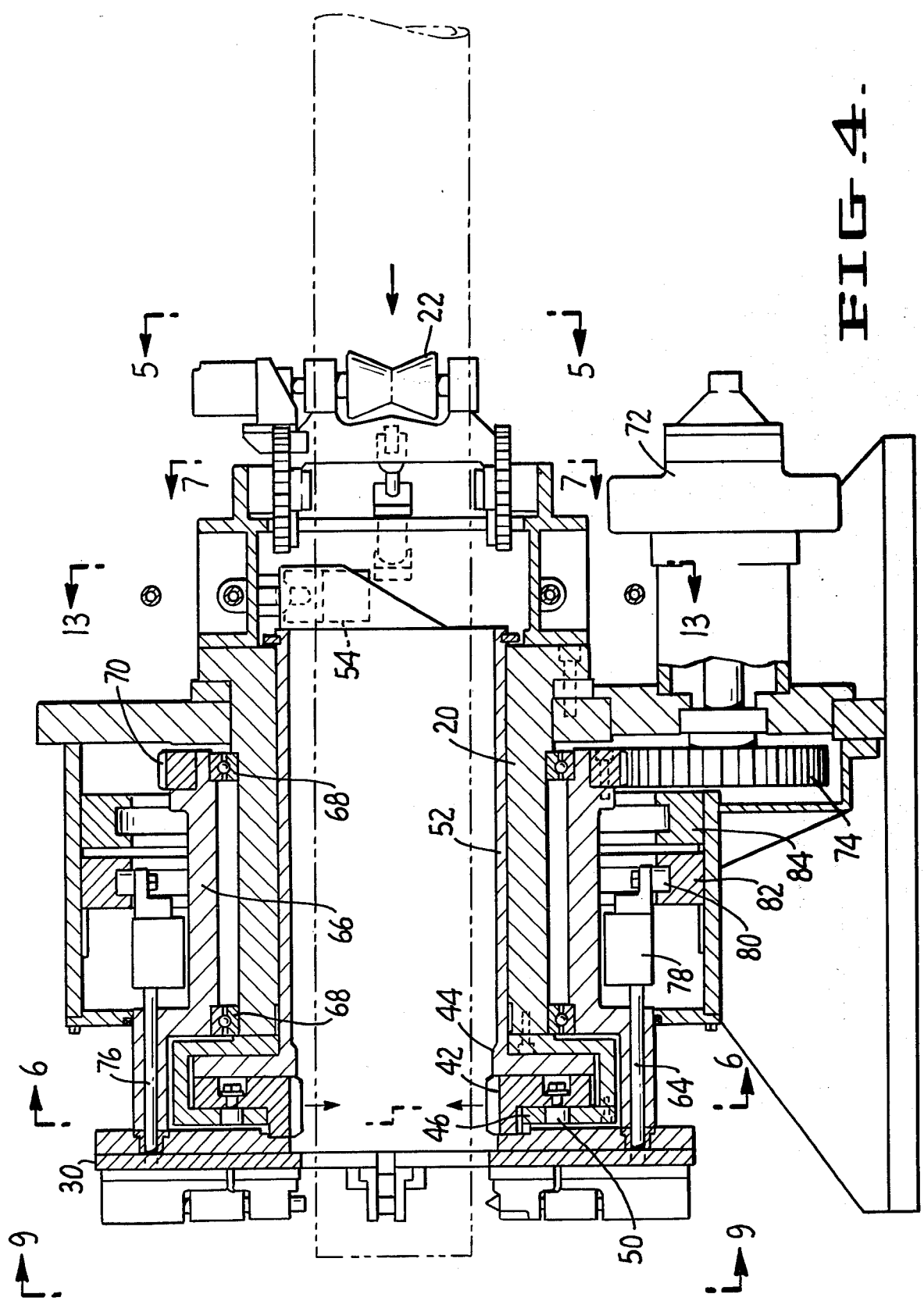
FIG. 4 is a sectional side view of the pipe cutting and trimming apparatus.

An end facing machine 18 is illustrated in somewhat greater detail in FIG. 2. The machine includes a stationary frame 20 having a central aperture into which the end of the pipe to be trimmed is inserted. At the entrance side of the machine, a pair of diametrically opposed pinch rollers 22 are provided to guide the pipe in its movement along the central axis of the machine aperture as it enters and exits the machine, as well as clamp it in place during the cutting and trimming operations. The pinch rollers 22 are preferably V-shaped, as best illustrated in FIG. 4, to effectively position circular pipes along the axis of the aperture during their movement. Each roller 22 is mounted on an arm 24 that is pivotally attached to the machine frame 20. The arms 24 are positioned by means of hydraulic piston and cylinder devices 26 that enable the rollers to be moved radially towards or away from the axis of the machine aperture, to thereby accomodate pipes of different widths. The pivotable arms 24 are interconnected by means of gear segments 28, so that their movement with respect to the machine axis will be symmetrical. The rollers 22 can be located on each side of the pipe, as illustrated in FIGS. 1 and 2, or can respectively located above and below the pipe.

A rotatable tool mounting plate 30 is located on the other end of the facing machine. During a facing operation, the tool mounting plate 30 rotates about the pipe 12, and it carries of number of facing tools that are selectively advanced into engagement with the pipe to carry out a desired facing operation.

Figure 3:
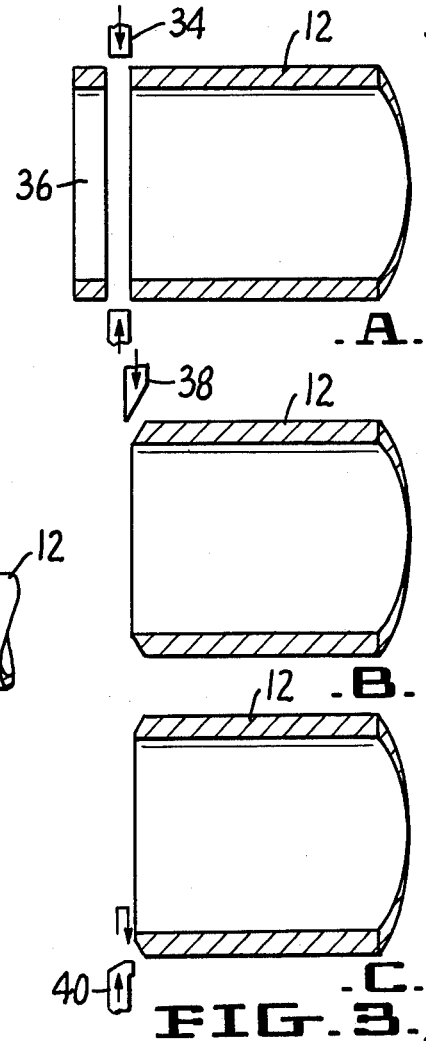
FIGS. 3A, 3B and 3C respectively illustrate the cutting, bevelling and deburring operations performed on the end of a pipe.

The operations that are carried out by the facing tools 32 are illustrated in detail in FIG. 3. The first operation to be performed is to cut a pipe 12 to the desired length. This operation is performed by cutting knives 34 that are advanced radially inward towards the pipe as the tool mounting plate 30 is spinning around the pipe, to make the desired cut, as illustrated in FIG. 3A. Typically, the portion 36 of the pipe that is cut away is of suitable size, for example 2 inches or more in length, to enable it to be used for weld testing or the like.

After the pipe is cut to an appropriate length, the cut edge of the pipe is provided with a bevel by means of a bevelling knife 38. As illustrated in FIG. 3B, the bevelling knife 38 is advanced radially inward to a predetermined position while the tool mounting plate 30 continues to spin around the pipe. An appropriately angled face on the bevelling knife 38 provides the desired bevel on the cut face of the pipe.

Thereafter, the burr, or pointed edge, that appears on the inside wall at the cut edge of the pipe as a result of the bevelling operation is removed by a deburring knife 40. In operation, the deburring knife is advanced radially inward while being maintained out of contact with the pipe until it is positioned radially within the pipe. The knife 40 is then advanced in an axial direction so that its cutting edge is in alignment with the cut face of the pipe. Thereafter, the deburring knife 40 is moved in a radially outward direction while the tool mounting plate 30 continues to spin around the pipe, and removes the burr from the interior edge of the pipe to provide a finished pipe face.

Figure 5:
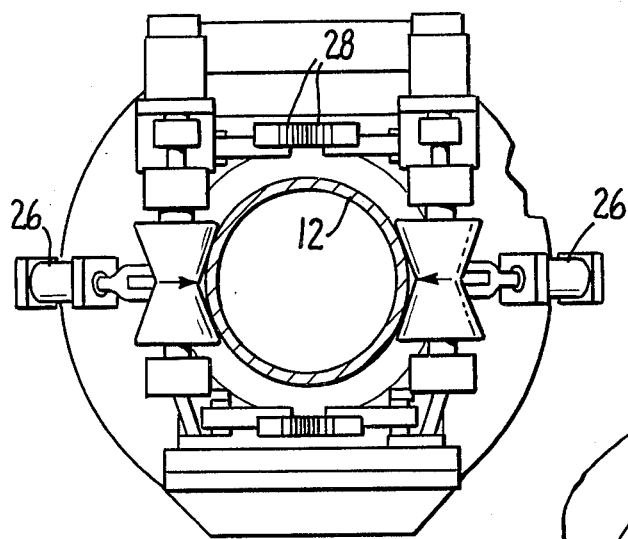
FIG. 5 is an end view of the pipe cutting and trimming apparatus from the end thereof through which a pipe enters, taken along the section line 5—5 of FIG. 4.

The end facing machine is illustrated in greater detail in cross section in FIG. 4. As discussed previously, the radially movable, diametrically opposed rollers 22 clamp the pipe 12 at the entrance side of the machine to prevent any lateral movement thereof during the cutting operation, as best illustrated in FIG. 5. In addition, it is desirable to clamp the pipe immediately adjacent the end that is being trimmed. For this purpose, a plurality of radially movable clamping jaws 42 are arranged around the circumference of the pipe adjacent the tool mounting plate 30. The clamping jaws 42 are mounted in recesses in a clamping ring 44 that provide for the radial movement of the jaws.

A cam ring 46 mounted adjacent the jaws 42 and the clamping ring 44 includes a plurality of cam slots 48, one being associated with each clamping jaw 42. The cam slots are disposed in a generally circumferential direction, but have a slight angle relative thereto, i.e. their orientation includes a radial component as well as a circumferential one. Each clamping jaw 42 has a pin 50 that is disposed within a cam slot 48 associated with that jaw.

Figure 7:
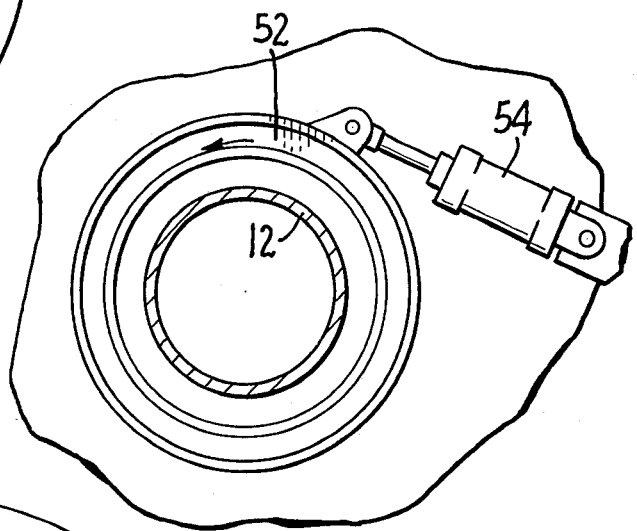
FIG. 7 is a sectional end view of the pipe cutting and trimming apparatus taken along the section line 7—7 of FIG. 4, illustrating the actuator for the pipe clamping mechanism.
Figure 6:
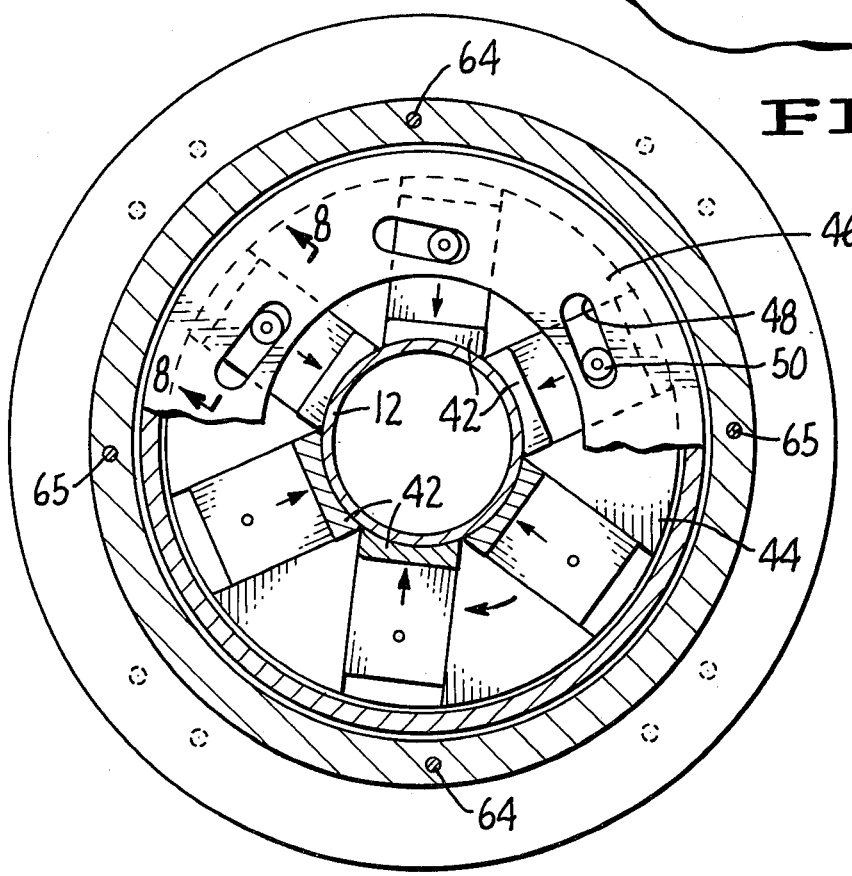
FIG. 6 is a sectional end view of the pipe cutting and trimming apparatus taken along the section line 6—6 of FIG. 4, illustrating a pipe clamping mechanism.
Figure 8:
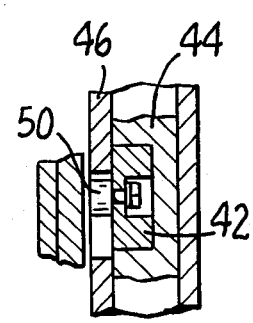
FIG. 8 is a sectional top view of the pipe clamping mechanism taken along the section line 8—8 of FIG. 6.

The cam ring 46 is stationarily mounted with respect to the machine frame 20, while the clamping ring 44 is rotatable relative thereto about the machine's longitudinal axis. To enable rotary motion to be provided thereto, the cam ring 44 includes an integrally attached sleeve 52 that extends toward the entrance side of the machine. An actuating cylinder 54 is attached between the sleeve 52 and the stationary frame 20 of the machine, as illustrated in FIG. 7. Upon actuation of the cylinder, the sleeve 52 and the clamping ring 44 are rotated relative to the machine frame and the cam ring 46. This rotation of the clamping ring 44 relative to the cam ring 46 causes the pins 50 of the clamping jaws 42 to ride within the the cam slots of the ring 46, which imparts movement in the radial direction to the jaws, causing them to clamp the pipe 12 firmly in plce within the machine, as best illustrated in FIG. 6.

In the illustrated embodiment of the invention, four facing tools are symmetrically arranged on the tool mounting plate 30, as illustrated in FIG. 9. These include two diametrically opposed cutting knives 34 that are operated simultaneously. One bevelling knife 38 and one deburring knife 40 are mounted on the plate 30 in a diametrically opposed relationship and at 90° relative to the cutting tools 34.

The mechanism for advancing each of the facing tools in a radial direction into and out of engagement with the pipe during rotation of the tool mounting plate 30 is illustrated in FIGS. 10–13. Each of the knives is attached to an elongated support rod 56 that is mounted for longitudinal movement in the radial direction by means of a pair of guide members 58 and 59 that are fixedly attached to the tool mounting plate 30. A limit block 60 attached to the rod 56 abuts the guide members 58 and 59 at appropriate points in the reciprocal travel of the tool to thereby limit its motion. The end of the support rod that is remote from the tool includes a toothed rack which engages and cooperates with a rotatable pinion 62 mounted on the radially outermost guide member 59. The second toothed rack is provided on an actuator rod 64 that is adapted for longitudinal movement in the axial direction and is perpendicularly disposed relative to the support rod 56. Axial movement of the actuator rod 64 provides rotary motion to the pinion 62, which in turn drives the support rod 56 and the tool in a radial direction.

The tool mounting plate 30 is supported for rotation on the machine by means of a generally cylindrical housing 66 that is journalled for rotation on the machine frame 20 by means of bearings 68. A ring gear 70 is disposed on one end of the support housing 66. A motor 72, such as an hydraulic motor for example, drives a pinion gear 74 that meshes with the ring gear 70, to rotate the housing 66 and the tool mounting plate about the central axis of the machine.

Figure 12:
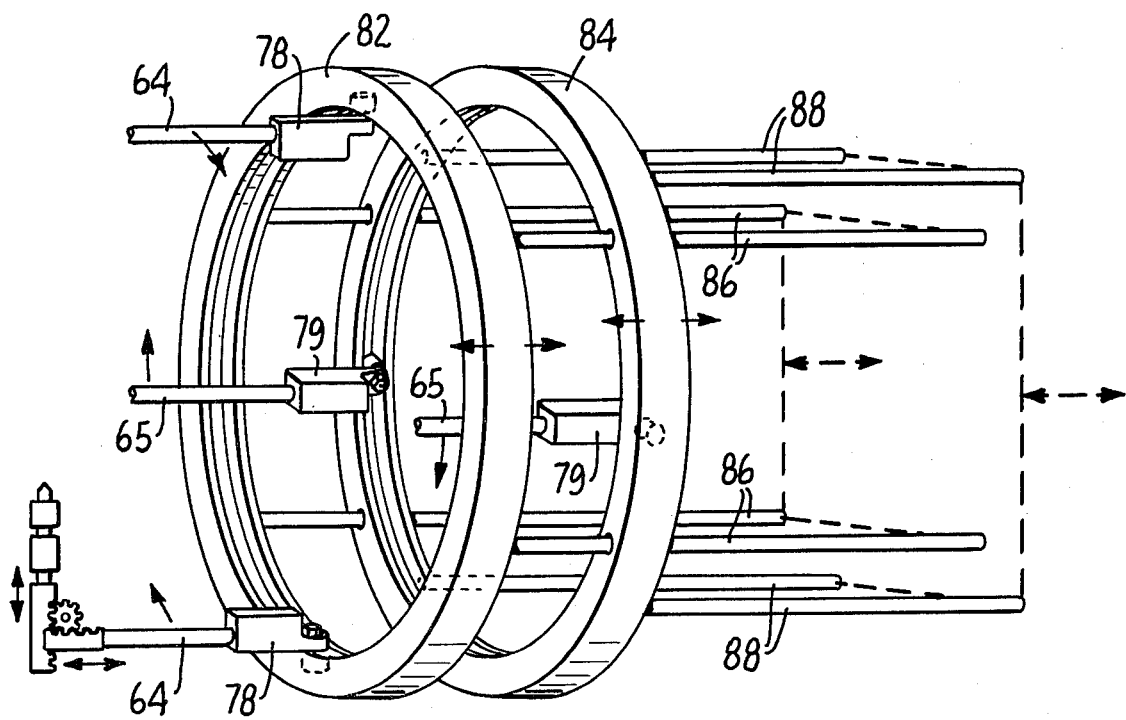
FIG. 12 is a perspective view of the actuator rings and displacement rods for the cutting tool advancing mechanism.

The axially movable actuator rods 64 are supported in a stepped end portion 76 of the tool mounting plate support housing 66. The ends of the rods 64 remote from the rack that engages the pinion 62 are attached to a slide block 78. Each slide block includes a pin 80 that is disposed within a channel, or groove, on the interior surface of an actuator ring 82. As best illustrated in FIG. 12, the advancing mechanism for the two diametrically opposed cutting knives, including the actuator rod 64 and slide block 78, are attached to a first actuator ring 82, and the advancing mechanism for the bevelling tool and the deburring knife, including the actuator rods 65 and slide blocks 79, are attached to a second actuator ring 84 that is concentrically arranged with the first actuator ring and capable of moving independently thereof.

The actuator rings 82 and 84 do not rotate with the tool mounting plate and the various facing tools. Therefore, during rotation of the tool mounting plate 30 and the facing tools mounted thereon, the slide pins 80 of the advancing mechanisms move within the grooves disposed in the interior surfaces of the actuator rings.

Axial displacement of the actuator rings 82 and 84 is effected by means of displacement rods 86 and 88. As illustrated in FIG. 12, the displacement rods 86 that are connected to the forwardmost actuator ring 82 pass through appropriate apertures in the rear actuator ring 84, so that the two rings can be axially displaced independently of one another. At their ends remote from the actuator rings 82 and 84, the displacement rods 86 and 88 are connected to ball screw mechanisms that provide movement thereto.

Figure 13:
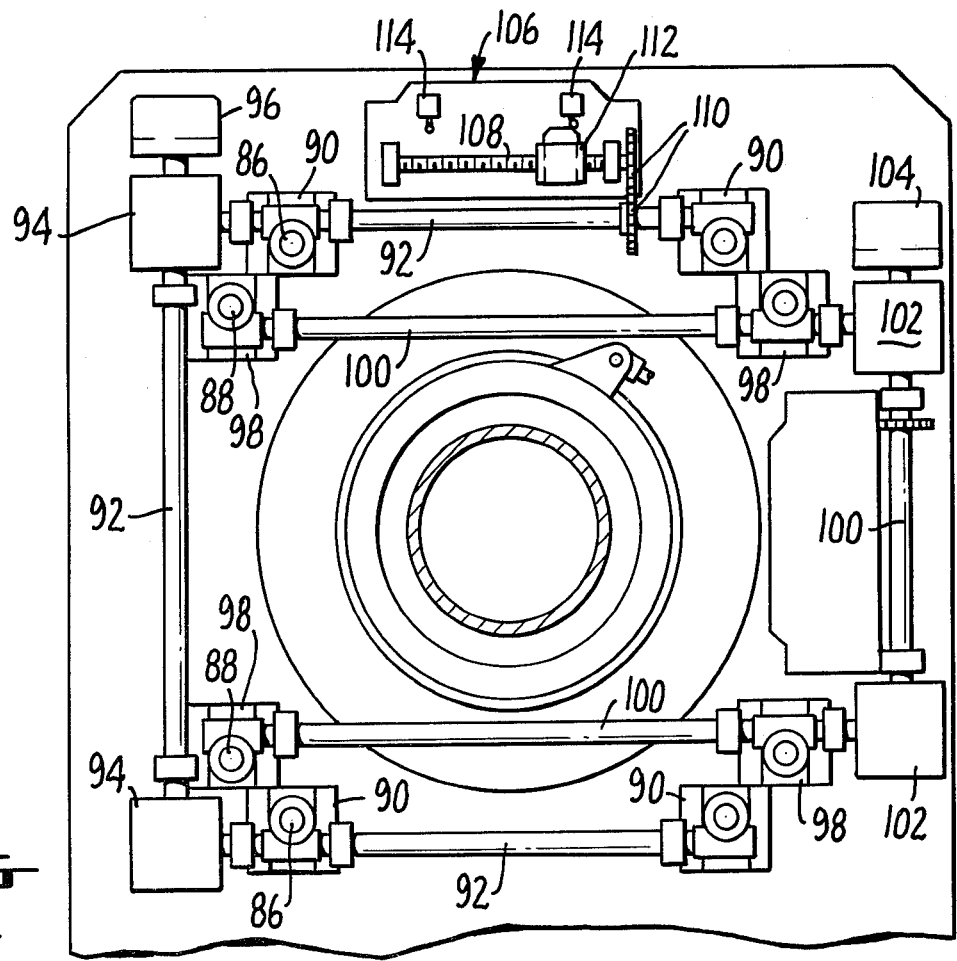
FIG. 13 is an end view of the cutting and trimming mechanism taken along the section line 13—13 of FIG. 4, illustrating the displacement rod control mechanisms.

As illustrated in FIG. 13, ball screw drive mechanisms 90 for driving the displacement rods 86 connected to the forward actuator ring 82 are interconnected by means of appropriate drive shafts 92 and transmission mechanisms or angle boxes 94, and are driven in unison by a suitable motor, such as an hydraulic motor 96. Similarly, ball screw jacks 98 for driving the displacement rods 88 connected to the rear actuator ring 84 are interconnected by means of drive shafts 100 and angle boxes 102 and driven in unison by a motor 104.

If desired, a stop or limit mechanism 106 can be connected to one or both of the drive systems for the displacement rods to limit the axial displacement of the actuator rings 82 and 84. The stop mechanism 106 includes a threaded shaft 108 that is driven in unison with the ball screw mechanisms for the displacement rods, for example by means of gears 110 connected between the threaded shaft 108 and the drive shaft 92 for the ball screw jacks. A slide member 112 is threadedly connected to the threaded shaft 108 an axially displaced by rotation thereof. The slide member 112 engages suitable limit switches 114 at appropriate points during the axial travel thereof, to deactuate the drive motor 96 for the ball screw jacks 90, and thereby limit the axial displacement of the actuator ring 82. A similar type of stop mechanism can be provided for limiting axial displacement of the actuator ring 84.

As noted previously, the operation of the deburring knife is somewhat different from that of the cutting knives and the bevelling knife, in that it includes axial displacement of the knife as well as movement in a radial direction. The apparatus for accomplishing this required type of motion is illustrated in detail in FIGS. 14–17. The deburring knife 40 is mounted on a support member 116 that is disposed for pivotal movement about rods or pins 118 that are oriented transverse to the axial direction of movement of the deburring knife and to the longitudinal axis of the pipe. The suppor member 116 is arranged or appropriately biased so that the deburring knife 40 is normally maintained in a position that is out of contact with the cut or bevelled edge of the pipe 12, i.e. the radially innermost tip of the deburring knife 40 is disposed to the left as illustrated in FIG. 14. Such biasing can be provided, for example, by suitably weighting the support member 116 so that it tends to normally assume the position illustrated in FIG. 14. The support member 116 is disposed between two support flanges 120 to which the pivot pins 118 are attached, and which move in the radial direction in accordance with displacement of a rack and pinion mechanism of the type illustrated in FIG. 10.

A cam member 122 is mounted on the tool mounting plate 30 such that it does not undergo radial displacement with the deburring knife 40. Pivot arms 124 are attached to the radially movable portion of the deburring knife assembly, and each includes a cam surface 126 that rides along the cam member 122. As the deburring knife 40 is displaced radially inward, i.e. in an upward direction as viewed in FIGS. 14–16, the cam surface 126 of the pivot arms 124 engages a shoulder 128 on the cam member 122 that causes the pivot arms 124 to rotate in a counterclockwise direction as viewed in FIG. 14. The pivot arms 124 are also in engagement with a lower, laterally projecting portion 130 of the deburring knife mounting member 116. The rotation of the pivot arms 124 to the left as viewed in FIG. 14 causes the deburring knife mounting member 116 to rotate in a clockwise direction around the pivot pins 118, thereby moving the deburring knife 40 to the right into alignment with the bevelled edge of the pipe. The shoulder 128 on the cam member 122 is located so that this axial displacement of the deburring knife 40 occur after the knife is in a position located radially inward of the interior wall of the pipe 12.

Pivotable locking arms 132 are mounted on the flanges 120 that support the tool mounting member 116. The locking arms each include a lateral projection, or shoulder, 134 that normally rests on the end of the pivot arm 124 when the pivot arm is not in engagement with the shoulder 128 of the cam member 122. However, when the pivot arm 124 is pivoted to the left, as viewed in FIG. 14, by the cam member 122 to the position illustrated in FIG. 16, the locking arm is biased downwardly by a spring 136 so that the shoulder 134 thereon engages the end of the pivot arm 124, as illustrated in FIG. 16. This engagement of the locking arm 132 with the pivot arm 124 prevents the pivot arm from being displaced to the right after it disengages the shoulder 128 on the cam member 122, and thereby maintains the deburring knife 140 in the axial position illustrated in FIG. 16. Consequently, as the deburring knife is moved in a radially outward direction, i.e. downward as viewed in FIGS. 14–17, it will engage the cut edge of the pipe 12 and remove the burr appearing at the interior surface thereof.

The locking arms 132 include laterally projecting pins 138 that engage limit members 140 during the radially outward displacement of the deburring tool after it has removed a burr from the cut pipe. The limit members 140 prevent further radial displacement of the locking arms 132, causing them to pivot in a counterclockwise direction against the bias of the spring 136, thereby releasing the pivot arms 124 and enabling the tool mounting member 116 and the deburring knife 40 to rotate in a counterclockwise direction about the pivot pins 118, to thereby ready the deburring knife for the next end facing operation.

In operation, the end of the pipe to be trimmed is fed into the central aperture of the facing machine, and the hydraulic cylinders 26 are actuated to bring the pinch rollers 22 into engagement with the pipe and guide it along the central axis of the aperture. Once the pipe is properly positioned relative to the facing tools, the hydraulic cylinder 54 is actuated to pivot the clamping ring 44, causing the clamping jaws 42 to move radially inward due to the cooperation between their respective pins 50 and the cam slots 48 on the stationary cam ring 46. Once the pipe is clamped in position, the hydraulic motor 72 is actuated to drive the pinion gear 74 and thereby rotate the tool mounting plate 30 about the pipe by means of the ring gear 70 and the rotatable housing 66. When the tool mounting plate 30 reaches a suitable speed, the hydraulic motor 96 is actuated to drive the ball screw jacks 90, thereby providing axial displacement to the displacement rods 86 and the forward actuator ring 82. The slide blocks 78 that are rotating within the interior groove of the actuator ring 82 are similarly advanced in an axial direction and impart radially inward movement to the two opposed cutting knives 34 through the cooperation of the pinion 62 with the racks on the ends of the support rods 56 and the actuator rods 64. The radial advancement of the cutting tool progresses until they have passed through the wall of the pipe and cut off the scrap material.

Thereafter, as the hydraulic motor 96 is actuated in the reverse direction to withdraw the cutting tools by displacing the actuator ring 82 to the right as viewed in FIG. 4, the hydraulic motor 104 is simultaneously actuated to advance the actuator ring 84 through axial displacement of the displacement rods 88. The slide blocks 79 rotating within the actuator ring 84 are similarly displaced in an axial direction, and cause the bevelling knife and the deburring knife to move radially inward. During this radially inward motion, the deburring knife is maintained in the axial position illustrated in FIG. 14, whereby it can pass by the cut edge of the pipe without engaging it. Simultaneously, the bevelling knife 38 is brought into engagement with the cut edge of the pipe to provide the proper bevel thereto. When the bevelling knife 38 reaches the predetermined proper position for providing the appropriate bevel to the cut edge of the pipe, further radial displacement of the bevelling and deburring knives is interrupted by means of the limit mechanism 106 associated with the drive mechanism for the displacement rods 88. Meanwhile, as the deburring knife reaches a predetermined radial position that is within the interior of the pipe, the cooperation between the pivot arms 124 and the cam surface 122 causes the deburring knife to be pivoted to the right as viewed in FIG. 16. The hydraulic motor 104 is thereafter actuated in a reverse direction to withdraw the bevelling and deburring knives through axial displacement of actuator ring 84 to the right as viewed in FIG. 4. During this radially outward motion, the deburring knife 40 is maintained in the axial position illustrated in FIG. 16 by the locking arms 132, and thereby removes the burr from the interior edge of the pipe. Subsequently, as the deburring knife continues its radially outward motion, the pivot arms 124 are released from locking engagement with the locking arms 132 as a result of the engagement of the pins 138 on the locking arms 132 with the limit members 140.

At this point, the facing operation on the end of the pipe is completed. The hydraulic motor 72 can be deactuated, along with the hydraulic cylinder 54 to release the clamping jaws 42, and the pipe can be withdrawn from the facing machine.

The present invention can be embodied in other specific forms without departing from the spirit or essential characteristics thereof. The presently disclosed embodiment is therefore considered in all respects to be illustrative and not restrictive. The scope of the invention is indicated by the appended claims rather than by the foregoing description, and all changes that come within the meaning and range of equivalency of the claims are therefore intended to be embraced therein.

What is claimed is:

1. Apparatus for preparing the end face of a pipe to enable it to be conveniently welded to the end of another pipe to form a continuous pipeline, comprising:
   means for clamping a pipe in a predetermined stationary position;
   a tool mounting plate disposed around a pipe clamped in said position;
   means for rotating said mounting plate around the pipe;
   at least one each of a cutting knife, a bevelling knife, and a deburring knife mounted on said mounting plate;
   means for advancing said cutting knife in a radial direction while said mounting plate is rotating; and
   means for advancing said bevelling knife and said deburring knife in a radial direction independently of the advancement of said cutting knife.

2. The apparatus of claim 1 wherein said deburring knife advancing means includes means for moving said deburring knife in an axial direction when it reaches a predetermined radial position.

3. The apparatus of claim 2 wherein said axial moving means includes a pivotally mounted knife support member that is adapted for movement in a radial direction and means for pivoting said support member about its pivot axis.

4. The apparatus of claim 3 wherein said pivot axis is transverse to the axial direction of movement of said support member and to the rotational axis of said mounting plate.

5. The apparatus of claim 3 wherein said pivoting means includes a cam member mounted on said mounting plate and means for engaging said cam member and pivoting said support member when it reaches said predetermined radial position.

6. The apparatus of claim 5 wherein said engaging means includes a pivotable arm disposed between said cam member and said support member, and further including means for locking said pivotable arm in a predetermined position after it engages said cam member to maintain said deburring knife in a predetermined axial position.

7. The apparatus of claim 2 or 3 including means for maintaining said deburring knife in a predetermined axial position after it reaches said predetermined radial position and for releasing it when it reaches a second predetermined radial position during movement in a radially outward direction.

8. The apparatus of claim 1 wherein said cutting knife advancing means includes an actuator ring mounted concentrically with said mounting plate, means for moving said actuator ring in an axial direction toward and away from said mounting plate, and means connected to said cutting knife for translating axial movement of said actuator ring into radial motion.

9. The apparatus of claim 8 wherein said translating means includes a first toothed rack that is moved in the axial direction by said actuator ring, a pinion in engagement with said first toothed rack and driven thereby, and a second toothed rack disposed substantially perpendicular to said first toothed rack and in engagement with said pinion to be driven in a radial direction.

10. The apparatus of claim 8 or 9 wherein said translating means rotates with said mounting plate and relative to said actuator ring.

11. The apparatus of claim 8 wherein said bevelling knife and deburring knife advancing means includes a second actuator ring mounted concentrically with said mounting plate, means for moving said second actuator ring in an axial direction independently of movement of the other actuator ring, and means connected to said bevelling knife and said deburring knife for translating axial movement of said second actuator ring into radial motion.

12. The apparatus of claim 1 comprising first and second cutting knives mounted diametrically opposite one another on said mounting plate, and wherein said bevelling knife and said deburring knife are mounted diametrically opposite one another and symmetrically relative to said cutting knives.

13. The apparatus of claim 1 wherein said clamping means includes a plurality of clamping jaws mounted at spaced locations around the circumference of the pipe on a clamping ring that provides for radial movement of said jaws, a cam ring having a plurality of cam slots, respectively associated with said jaws, that are each disposed at an angle relative to the circumferential direction, cam pins respectively connected to said jaws and disposed in said cam slots, and means for rotating one of said clamping ring and said cam ring relative to the other to cause said pins to move in said cam slots and thereby move in a radial direction.

14. The apparatus of claim 1 or 13 wherein said clamping means is located adjacent said tool mounting plate.

15. The apparatus of claim 14 further including second pipe clamping means located remote from said tool mounting plate.

16. The apparatus of claim 15 wherein said second pipe clamping means comprises a pair of opposed rollers respectively mounted on pivotable arms, and means for pivoting said arms to move said rollers towards and away from each other.

17. The apparatus of claim 16 wherein said rollers are V-shaped and function to center a pipe along the axis of rotation of said tool mounting plate.

18. The apparatus of claim 1 wherein said deburring knife advancing means includes means for maintaining said deburring knife in a first axial position during radially inward movement thereof, transferring said deburring knife to a second axial position upon reaching a predetermined radial position, and maintaining said deburring knife in said second axial position during radially outward movement thereof.

19. Apparatus for cutting and trimming the end face of a pipe, comprising:
means for clamping a pipe in a predetermined stationary position;
a tool mounting plate disposed around a pipe clamped in said position;
means for rotating the mounting plate around the pipe;
at least one each of a cutting knife, a bevelling knife and a deburring knife mounted at circumferentially spaced locations around said mounting plate;
means for moving said cutting knife radially inward during rotation of said mounting plate to thereby cut a pipe clamped in said position;
means for moving said bevelling knife and said deburring knife radially inward during rotation of said mounting plate while maintaining said deburring knife in a first axial position out of contact with the cut edge of the pipe, to thereby provide a bevel on the cut edge of the pipe; and
means for moving said deburring knife to a second axial position wherein it is in alignment with the cut edge of the pipe when said deburring knife reaches a radial position that is within the walls of the pipe, and for maintaining said deburring knife in said second axial position as said deburring knife is moved radially outward to thereby remove burrs on the cut pipe edge.

* * * * *